2,909,515

MONOAZO DYESTUFFS AND THEIR METAL COMPLEX COMPOUNDS

Hans Ruckstuhl, Basel, and Walter Wehrli, Riehen, Switzerland, assignors to Sandoz A.G., Basel, Switzerland, a Swiss firm No Drawing. Application January 20, 1958
Serial No. 709,763

Claims priority, application Switzerland February 1, 1957

7 Claims. (Cl. 260—146)

This invention relates to monoazo dyestuffs and their metal complex compounds, which in the metal-free form correspond to the general formula

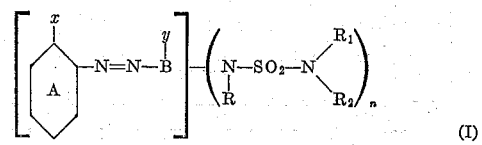

(I)

wherein $x$ represents a substituent capable of metal complex formation,
$y$ a phenolic or enolic hydroxy group or a primary or secondary amino group in ortho-position to the —N=N group,
$n$ the figure 1 or 2,
B the radical of a coupling component,
R hydrogen or a low molecular alkyl or hydroxyalkyl radical,
$R_1$ a low molecular alkyl radical which may be unsubstituted or substituted by chlorine, methoxy or ethoxy, and
$R_2$ a low molecular alkyl radical which may be unsubstituted or substituted by chlorine, methoxy or ethoxy, or together with N and $R_1$ the radical of a saturated heterocyclic amine, and wherein B and the nucleus A may contain further substituents.

Especially valuable dyestuffs are the monoazo dyestuffs and their metal complex compounds, which in the metal-free form correspond to the formula

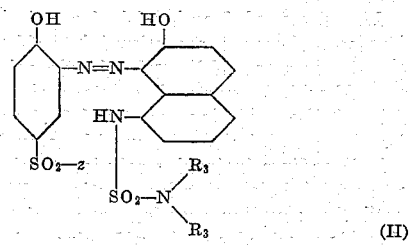

(II)

wherein $R_3$ represents an unsubstituted low molecular alkyl radical and $z$ represents a lower alkyl radical, an amino group, a lower alkylamino group, a lower hydroxyalkylamino group or the radical of a heterocyclic amine bound to the —SO$_2$-group through its nitrogen atom.

Throughout the specification the words "lower" or "low molecular" used for defining hydrocarbon radicals mean "containing 1 to 5 carbon atoms."

The process for producing the new monoazo dyestuffs and their metal complex compounds consists in coupling 1 mol of the diazo compound of an aminobenzene containing in the ortho-position to the amino group a substituent capable of metal complex formation with 1 mol of a coupling component which couples in an adjacent position to a phenolic or enolic hydroxy group or to a primary or secondary amino group. The resultant dyestuff, which must exhibit at least once but not more than twice the grouping

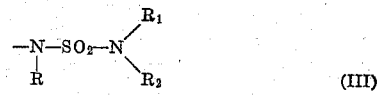

(III)

wherein R, $R_1$ and $R_2$ possess the above-recited meanings, is treated in substance or on the fiber with a metal-yielding agent in such manner as to give rise to a metal-containing azo dyestuff which contains essentially one metal atom in complex combination with two molecules of the mono-azo compound.

The substituent $x$ of the diazo component, which permits metal complex formation, is preferably a hydroxy, methoxy or carboxy group. Examples of substituents which may be present in the nucleus A as here defined are halogen atoms (chlorine, bromine), nitro, acetylamino, benzoylamino, carboxy, carbomethoxyamino, carbethoxyamino, methyl, ethyl, tert. butyl, methoxy, sulfonic acid, sulfonic acid-amide, sulfonic acid-methylamide, sulfonic acid-dimethylamide, sulfonic acid-(2'-hydroxy)-ethylamide, sulfonic acid-di-(2'-hydroxyethyl)-amide, sulfonic acid-(hydroxy)-propylamide, sulfonic acid-(methoxy)-propylamide, sulfonic acid-phenylamide, sulfonic acid-(2'-carboxy)-phenylamide, and methylsulfonyl groups, also a

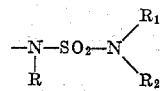

group, wherein R, $R_1$ and $R_2$ possess the aforecited meanings.

Of the coupling components which are applicable in the process, the following may be enumerated as examples: hydroxybenzenes, hydroxynaphthalenes, aminonaphthalenes, alkylamino-, cycloalkylamino-, aralkylamino- and arylamino-naphthalenes, 1-aryl-3-methyl-5-pyrazolones, acylacetylaminoalkanes, acylacetylaminobenzenes and acylacetylaminonaphthalenes. These coupling components may contain the same substituents as the diazo components, the preferred substituent being the

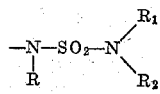

group, wherein R, $R_1$ and $R_2$ possess the aforenamed meanings.

The aminobenzenes conforming to the present definition are diazotized in the normal way at 0–5° C. The

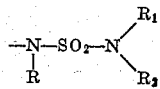

group is stable to acids and caustic lyes in cold solution.

The diazo compounds thus obtained are coupled with the coupling components containing one phenolic or enolic hydroxy group at 0 to 10° C., for which purpose it is best to use a weakly acid to weakly alkaline or strongly alkaline medium, to which an addition of pyridine or another tertiary amine of the same type may be made. When the coupling components contain a primary or secondary amino group, coupling is effected at 10 to 20° C. in a weakly acid, preferably acetic acid, medium. Upon formation of the monoazo compound it is separated from the coupling mass, if necessary by the addition of salt, and filtered off.

The monoazo dyestuffs are converted into their metal complex compounds preferably with chromium or cobalt compounds. Metallization is carried out to best effect in an aqueous solution or an organic medium, e.g., formamide, dimethylformamide, ethylene glycol, ethoxyethanol etc. or in the concentrated aqueous solution of an alkali metal salt of a low molecular aliphatic monocarboxylic acid. It is advisable to proportion the reactants so that two molecules of the monoazo dyestuff are acted upon by a quantity of metal-yielding agent containing less than two but at least one atom of metal.

Suitable chromium compounds are, e.g., chromic fluoride, chromic sulfate, chromic formate, chromic acetate, chromic potassium sulfate or chromic ammonium sulfate. The chromates, e.g., sodium or potassium chromate and sodium or potassium bichromate, are also eminently suitable for metallizing the monoazo dyestuffs. It is advantageous to employ a strongly caustic alkaline medium, to which reducing substances may be added if desired.

Suitable cobalt compounds are, e.g. cobaltous formate, cobaltous acetate and cobaltous sulfate. When metallizing is carried out in a concentrated aqueous solution of the alkali metal salt of a low molecular aliphatic monocarboxylic acid, water-insoluble metal compounds may be used, for example cobalt hydroxide and cobalt carbonate.

It is of especial advantage to conduct metallization in an aqueous or alkaline medium to which the metal compounds are added in presence of compounds which maintain the metals dissolved in complex combination in caustic alkaline medium; examples of such compounds are tartaric, citric and lactic acid.

The metal complex compounds thus obtained are precipitated from aqueous medium by the addition of salt—if preferred after pouring the organic metallizing solutions into water—and subsequently filtered off, washed if desired, and dried.

The resultant metal-containing azo dyestuffs are homogeneous metal complex compounds in which essentially one atom of metal is combined with two molecules of the monoazo compound. The metal complex compounds are so-called 1:2 complexes in which one molecule of the monoazo compound is linked with approximately 0.3 to 0.7 atom of metal.

The new monoazo dyestuffs possess good building-up properties on wool, silk, leather and synthetic polyamide fibers by the afterchroming and one-bath chroming processes. The obtained red, yellow, brown, green, blue, violet and gray shades present good fastness properties to light, washing, milling, potting perspiration, alkali, acids and hard water.

The metal-containing azo dyestuffs have very good affinity for wool, silk, leather and synthetic polyamide fibers, good leveling properties and a very little sensitivity to hard water and calcium ions. They dye these fibers from neutral or weakly acid dyebaths in level red, yellow, brown, green, blue, violet and gray shades which are fast to light, washing, milling, perspiration and crocking. The reserve of cotton in mixed fabrics is sufficient. The dyeings obtained with the chromiferous azo dyestuffs possess in addition an excellent fastness to acids.

The metalliferous azo dyestuffs with sufficiently high solubility in organic solvents can also be employed for dyeing artificial fibers dissolved in organic solvents prior to spinning and also for coloring paints, lacquers and all types of plastics. The dope-dyeings thus obtained are fast to light, washing, perspiration, gas fumes and crocking.

In the following examples the parts and percentages are by weight. The temperatures are in degrees centigrade.

*Example 1*

18.8 parts of 2-amino-1-hydroxybenzene-4-sulfonic acid-amide are diazotized at 5° in 100 parts of water with 17 parts of 30% hydrochloric acid and 6.9 parts of sodium nitrite. The diazo compound is neutralized with sodium carbonate and added to a suspension cooled to 5° and containing 27 parts of 1-(dimethylaminosulfonylamino)-7-hydroxynaphthalene, 200 parts of water and 30 parts of calcium hydroxide. The resulting suspension is kept in constant agitation overnight and subsequently sufficient 30% hydrochloric acid is added to give a strong acid reaction to Congo red. The monoazo dyestuff is filtered off, washed with water to free it of acid, and finally dried.

The dyeing procedure is as follows:

2 parts of the monoazo dyestuff obtained as described above and 10 parts of anhydrous sodium sulfate are dissolved in 6000 parts of water at 40°. 100 parts of wool are entered in this dyebath and the temperature raised to 100° in the course of about 30 minutes. After the addition of 20 parts of 10% acetic acid dyeing is continued for 30 minutes at the boil, then 20 parts of 10% formic acid are added and the bath maintained at 100° for a further 30 minutes. After this time 1 part of sodium bichromate in 10% aqueous solution is added and dyeing continued for 30 minutes at 100°. The afterchromed wool dyeing is removed, rinsed in water and dried. It is dyed in a level gray shade of very good fastness to light, washing, milling, potting, perspiration, acids and crocking.

*Example 2*

46.5 parts of the monoazo dyestuff of Example 1 are dissolved in 450 parts of formamide. The solution is heated to 90–100° and 35 parts of chromic ammonium sulfate and 40 parts of crystallized sodium acetate are added in portions over 30 minutes, after which the solution is maintained at 95° for 8 hours. It is then allowed to cool to room temperature and diluted with 1000 parts of a 10% aqueous solution of sodium chloride. The precipitated chromium-containing azo dyestuff is filtered off and the filter residue is washed well with a 10% sodium chloride solution. Upon drying and grinding the dyestuff is obtained as a blue-black powder which gives violet solutions in concentrated sulfuric acid and gray-blue solutions in hot water.

2 parts of the chromiferous azo dyestuff thus obtained are dissolved in 4000 parts of water at 40–50°. 100 parts of prewetted wool are entered into the solution which is then drop-fed with 2 parts of 100% acetic acid. The dyebath is heated to the boil in the course of 30 minutes and held at this temperature for a further 45 minutes. The dyed wool is then removed, rinsed with water and dried. The dyeing thus produced shows very good fastness to light, washing, milling, perspiration, acids and crocking.

*Example 3*

23.1 parts of 2-amino-1-hydroxy-4-dimethylaminosulfonylaminobenzene are stirred into 100 parts of water and 17 parts of 30% hydrochloric acid and diazotized at 0–5° with 6.9 parts of sodium nitrite. To the yellow-colored diazo solution are added 14.6 parts of powdered 2-hydroxynaphthalene followed by a sufficient volume of a 30% sodium hydroxide solution to give the suspension a phenolphthalein alkaline reaction. The mass is stirred until the coupling reaction is completed, then sodium chloride is added and the pH value adjusted to 8.5–9 by an addition of 30% hydrochloric acid. The precipitated monoazo compound is filtered off, washed with a 20% sodium chloride solution and dried at 80–85° in vacuo.

39 parts of this new monoazo compound are dissolved in 350 parts of formamide. At 95–100° 8.2 parts of chromic acetate containing 17.5% chromium and 5.2 parts of chromic formate containing 27.8% chromium are added to the solution and the mass is stirred at the same temperature for 3 hours, i.e. until metallizing is completed. Upon cooling the solution is diluted with water at 20° with stirring, causing precipitation of the new chromium complex compound which is then filtered off, dried at 70° in vacuo, and ground. A black powder is obtained which dissolves in hot dilute sodium carbonate solution with a gray violet coloration and in concentrated sulfuric acid with a violet coloration. It dyes wool, silk and polyamide fibers from neutral or weakly acid baths in fast gray shades.

The 2-amino-1-hydroxy-4-dimethylaminosulfonylaminobenzene can be produced, for example, from 4-acetylamino-1-hydroxybenzene by nitration, splitting off of the acetyl group, acylation with dimethylamidosulfonic acid chloride, and reduction of the nitro group.

Example 4

30 parts of the metal-free monoazo compound of Example 3 are suspended in 900 parts of water at 70° and dissolved with the requisite amount of a 30% sodium hydroxide solution. The solution, at 70–75°, is added to a solution of 11 parts of crystallized cobaltous acetate $[Co(CH_3COO)_2+4H_2O]$ in 70 parts of water and the temperature is maintained at 70° for 30 minutes with stirring. The metallizing mass is acidified at 50° with dilute acetic acid. Sodium chloride is then added and the new precipitated cobalt complex compound is filtered off and dried in vacuo at 70°. A dark violet-brown powder is obtained which dissolves in hot dilute sodium carbonate solution with a violet coloration and dyes wool, silk and polyamide fibers from weakly acid baths in fast Bordeaux shades.

Example 5

24.5 parts of 2-amino-1-hydroxy-4-(N-dimethylaminosulfonyl-N-methyl)-aminobenzene are dissolved in 150 parts of water with 20 parts of concentrated hydrochloric acid and diazotized in the normal manner at 0–5° with a concentrated aqueous solution of 6.9 parts of sodium nitrite.

After neutralization with sodium bicarbonate the diazo compound is run into a solution of 18 parts of 1-phenyl-3-methyl-5-pyrazolone, 4.2 parts of sodium hydroxide and 200 parts of water which has been previously cooled to 5°. On completion of coupling the precipitated dyestuff is filtered off and dried.

The isolated monoazo dyestuff is converted into the chromium complex compound by the procedure described in Example 2.

The dried and powdered chromiferous dyestuff is a brown powder which dyes wool from neutral or weakly acid baths in red-orange shades. The dyeings are fast to light and show very good fastness to wet treatments.

Example 6

18.8 parts of 2-amino-1-hydroxybenzene-4-sulfonic acid-amide are diazotized according to the particulars of Example 1. The diazo compound is then added to a solution of 28 parts of 1-(N-dimethylaminosulfonyl-N-methyl)-amino-7-hydroxynaphthalene, 40 parts of a 30% sodium hydroxide solution, 20 parts of anhydrous sodium carbonate and 300 parts of water.

The isolated dyestuff is converted into the chromium complex compound by the procedure described in Example 2. In this form it gives violet-brown solutions in water and dyes from neutral baths in maroon shades.

In the following table are enumerated further monoazo dyestuffs and metal-containing azo dyestuffs which are obtainable by the procedures described in Examples 1 to 6. In the table they are characterized by the diazo component (column I), the coupling component (II), the form of application (III), and the shade of the metal complex compound on wool or in spun-dyed acetate (IV). The abbreviations in column (III) represent:

Afterchr.=Afterchroming dyestuff
Cr-C=Chrome complex compound
Co-C=Cobalt complex compound

| Number of example | Diazo component (I) | Coupling component (II) | Application form (III) | Shade of the metal complex compound on wool or in spun-dyed acetate (IV) |
|---|---|---|---|---|
| 7 | 2-amino-1-hydroxy-4-(N-dimethylaminosulfonyl-N-methyl)-aminobenzene. | 1-acetylamino-7-hydroxynaphthalene. | Cr-C | Blue gray. |
| 8 | ---do--- | Acetoacetylaminobenzene. | Cr-C | Yellow. |
| 9 | ---do--- | 2-aminonaphthalene. | Co-C | Gray. |
| 10 | 2-amino-1hydroxy-4-dimethyl-aminosulfonylamino-6-nitrobenzene. | 1-hydroxy-2-acetylamino-4-methylbenzene. | Cr-C | Brown. |
| 11 | ---do--- | 2-hydroxynaphthalene. | Cr-C | Gray. |
| 12 | ---do--- | 2-hydroxynaphthalene-3.6-disulfonic acid. | Afterchr | Navy blue. |
| 13 | 2-amino-1hydroxy-4diethyl-aminosulfonylamino-5-chlorobenzene. | 1-phenyl-3-methyl-5-pyrazolone-3'-sulfonic acid. | Afterchr | Red-brown. |
| 14 | ---do--- | 1-acetoacetylamino-2-ethylhexane. | Cr-C | Orange. |
| 15 | 2-amino-1-hydroxy-4-dipropylaminosulfonylaminobenzene. | 2-hydroxynaphthalene. | Cr-C | Gray. |
| 16 | 2-amino-1-hydroxy-4-[N-di-(3'-methoxypropyl)-aminosulfonyl-N-methyl]-aminobenzene. | 2-hydroxynaphthalene-6-sulfonic acid-methylamide. | Co-C | Violet. |
| 17 | 2-amino-1-hydroxy-4-di-(ethoxy-ethyl)-aminosulfonylaminobenzene. | 1-(3'-cyano)-phenyl-3-methyl-5-pyrazolone. | Cr-C | Brown-red. |
| 18 | ---do--- | Barbituric acid. | Co-C | Yellow-brown. |
| 19 | 2-amino-1-hydroxy-4-methyl-6-(N-diethylaminosulfonyl-N-ethyl)-aminobenzene. | 1-hydroxy-4-methoxynaphthalene. | Cr-C | Blue. |
| 20 | 2-amino-1-hydroxy-4-methyl-sulfonyl-6-di-(2'-chlorethyl)-aminosulfonylaminobenzene. | 1-acetoacetylamino-1.1.3.3-tetramethylbutane. | Co-C | Yellow. |
| 21 | ---do--- | 1-[naphthyl-(2')]-3-methyl-5-pyrazolone-6'-sulfonic acid. | Afterchr | Red. |
| 22 | 2-amino-1-hydroxy-6-acetyl-amino-4-dimethylaminosulfonylaminobenzene. | 2-hydroxynaphthalene. | Cr-C | Gray. |
| 23 | 2-amino-1-hydroxy-4-[N-dimethylaminosulfonyl-N-methyl]-aminobenzene-6-sulfonic acid. | 2-phenylaminonaphthalene. | Afterchr | Greenish gray. |
| 24 | ---do--- | 1-phenyl-3-methyl-5-pyrazolone-3'-sulfonic acid-methylamide. | Afterchr | Red. |
| 25 | ---do--- | 1-hydroxynaphthalene-4-sulfonic acid. | Afterchr | Navy blue. |
| 26 | ---do--- | 2-acetoacetylaminonaphthalene-6-sulfonic acid. | Afterchr | Brown-yellow. |
| 27 | 2-amino-1-hydroxy-4-dimethyl-aminosulfonylaminobenzene-6-sulfonic acid-amide. | 1-acetoacetylaminobenzene-4-sulfonic acid-phenylamide. | Co-C | Yellow. |
| 28 | 2-amino-1-hydroxy-4-di-(isopropyl)-aminosulfonylaminobenzene-6-sulfonic acid methylamide. | 1-(3'-chloro(-phenyl-3-methyl-5-pryazolone-. | Cr-C | Brown-red. |
| 29 | 2-amino-1-hydroxy-4-dibutyl-aminosulfonylaminobenzol-6-sulfonic acid-(2'-hydroxy)-ethylamide. | 2-hydroxynaphthalene. | Co-C | Violet. |
| 30 | 2-amino-1-hydroxy-4-morpholylaminosulfonylaminobenzene. | 2-hydroxynaphthalene-6-sulconic acid. | Afterchr | Brownish gray. |
| 31 | 2-amino-1-hydroxy-4-piperidylaminosulfonylaminobenzene. | 1-(2'.3'-tetramethylene)-phenyl-3-methyl-5-pyrazolone-4'-sulfonic acid-methylamide. | Cr-C | Brown-red. |

| Number of example | Diazo component (I) | Coupling component (II) | Application form (III) | Shade of the metal complex compound on wool or in spun-dyed acetate (IV) |
|---|---|---|---|---|
| 32 | 2-amino-5-dimethylaminosulfonylaminobenzene-1-carboxylic acid. | ___do___ | Afterchr__ | Brown-orange. |
| 33 | ___do___ | 1-acetoacetylaminobenzene-4-sulfonic acid-(2'-methoxy)-phenylamide. | Cr-C | Yellow. |
| 34 | 2-amino-5-[N-dimethylaminosulfonyl-N-methyl]-aminobenzene-1-carboxylic acid. | 1-hydroxy-4-methoxynaphthalene. | Cr-C | Blue-violet. |
| 35 | 2-amino-5-[N-diethylaminosulfonyl-N-methyl]-aminobenzene-1-carboxylic acid. | 2-hydroxynaphthalene. | Cr-C | Violet. |
| 36 | ___do___ | 1-dimethylaminosulfonylamino-7-hydroxynaphthalene. | Cr-C | Violet-gray. |
| 37 | 2-amino-1-hydroxy-4-nitro-6-[N-dimethylaminosulfonyl-N-ethyl]-aminobenzene. | ___do___ | Cr-C | Gray. |
| 38 | ___do___ | 1-(4'-dimethylaminosulfonylamino)-phenyl-3-methyl-5-pyrazolone. | Cr-C | Red-brown. |
| 39 | ___do___ | 2-(4'-diethylaminosulfonyl-amino)-phenyl-aminonaphthalene. | Co-C | Gray. |
| 40 | 2-amino-1-hydroxy-4-[N-dimethylaminosulfonyl-N-methyl]-aminobenzene. | 1-acetoacetylamino-4-di-(ethyoxyethyl)-aminosulfonylaminobenzene. | Co-C | Yellow. |
| 41 | ___do___ | 2-hydroxynaphthalene. | Cr-C | Violet. |
| 42 | 2-amino-1-hydroxy-4-nitro-benzene. | 1-[N-dimethylaminosulfonyl-N-methyl]-amino-7-hydroxy-naphthalene. | Cr-C | Brown-violet. |
| 43 | 2-amino-1-hydroxy-5-nitrobenzene. | 1-dimethylaminosulfonylamino-7-hydroxynaphthalene. | Cr-C | Greenish gray. |
| 44 | 2-amino-1-hydroxy-4-chloro-6-nitrobenzene. | ___do___ | Cr-C | Do. |
| 45 | 2-amino-1-hydroxy-6-chloro-4-nitrobenzene. | ___do___ | Cr-C | Do. |
| 46 | 2-amino-1-hydroxy-4,6-dinitrobenzene. | ___do___ | Cr-C | Do. |
| 47 | ___do___ | 1-di-[(2'-ethoxy)-ethyl]-aminosulfonylamino-7-hydroxy-naphthalene. | Cr-C | Do. |
| 48 | 2-amino-1-hydroxy-4-methyl-6-nitrobenzene. | 1-di[(2'-chloro)-ethyl]-aminosulfonyl-amino-7-hydroxy-naphthalene. | Co-C | Yellow-brown. |
| 49 | 2-amino-1-hydroxy-4-acetylaminobenzene. | 1-(4'-dimethylaminosulfonylamino)-phenyl-3-methyl-5-pyrazolone. | Cr-C | Orange. |
| 50 | 2-amino-1-hydroxy-4-methylsulfonylbenzene. | ___do___ | Cr-C | Orange. |
| 51 | ___do___ | 1-dipropylaminosulfonylamino-7-hydroxynaphthalene. | {Co-C / Cr-C} | Gray-violet. / Gray. |
| 52 | 2-amino-1-hydroxybenzene-4-sulfonic acid-ethylamide. | 1-[N-dimethylaminosulfonyl-N-methyl]-amino-7-hydroxynaphthalene. | Cr-C | Maroon. |
| 53 | 2-amino-1-hydroxybenzene-5-sulfonic acid-amide. | ___do___ | Cr-C | Gray. |
| 54 | 2-amino-1-hydroxy-4-chlorobenzene-5-sulfonic acid-amide. | ___do___ | Cr-C | Do. |
| 55 | 2-amino-1-hydroxy-4-chlorobenzene. | 1-morpholylsulfonylamino-7-hydroxynaphthalene. | Cr-C | Do. |
| 56 | 2-amino-1-hydroxybenzene-4-sulfonic acid-amide. | ___do___ | {Cr-C / Co-C} | Do. / Gray-violet. |
| 57 | 2-amino-1-hydroxybenzene-4-sulfonic acid-methylamide. | 1-dimethylaminosulfonylamino-7-hydroxynaphthalene. | {Co-C / Cr-C} | Do. / Gray. |
| 58 | 2-amino-1-hydroxybenzene-4-sulfonic acid-(2'-hydroxy)-ethylamide. | 1-piperidylsulfonylamino-7-hydroxy-naphthalene. | {Cr-C / Co-C} | Do. / Gray-violet. |
| 59 | 2-amino-1-hydroxybenzene-4-sulfonic acid-(3'-methoxy)-propylamide. | 1-[N-morpholylsulfonyl-N-methyl]-amino-7-hydroxynaphthalene. | Cr-C | Maroon. |
| 60 | 2-amino-1-hydroxybenzene-4-sulfonic acid-amide. | 1-dibutylaminosulfonylamino-7-hydroxynaphthalene. | Cr-C | Gray. |
| 61 | ___do___ | 1-(4'-dimethylaminosulfonylamino)-phenyl-3-methyl-5-pyrazolone. | Cr-C | Orange. |
| 62 | ___do___ | 1-acetoacetylamino-4-dimethylaminosulfonylaminobenzene. | Co-C | Yellow. |
| 63 | ___do___ | 1-diethylaminosulfonylamino-7-hydroxynaphthalene. | Cr-C | Gray. |
| 64 | ___do___ | 1-[N-diethylaminosulfonyl-N-ethyl]-amino-7-hydroxynaphthalene. | Cr-C | Maroon. |
| 65 | 2-amino-1-hydroxy-4,6-dichlorobenzene. | 1-[N-dimethylaminosulfonyl-N-methyl]-amino-7-hydroxynaphthalene. | Cr-C | Brown-violet. |
| 66 | 2-amino-1-hydroxybenzene-4-sulfonic acid-morpholide. | 1-dimethylaminosulfonylamino-7-hydroxynaphthalene. | Cr-C | Gray. |
| 67 | 2-amino-1-hydroxy-4-chlorobenzene. | 1-[N-di-(2'-ethoxyethyl)-aminosulfonyl-N-methyl]-amino-7-hydroxy-naphthalene. | Cr-C | Brown-violet. |
| 68 | ___do___ | 1-[4'-(N-dimethylaminosulfonyl-N-methyl)-amino]-phenyl-3-methyl-5-pyrazolone. | Cr-C | Yellowish brown. |
| 69 | 2-aminobenzene-1-carboxylic acid. | ___do___ | Cr-C | Yellow. |
| 70 | 2-amino-1-methoxybenzene-4-sulfonic acid-phenylamide. | ___do___ | Cr-C | Orange. |
| 71 | 2-aminobenzene-1-carboxylic acid. | 1-acetoacetylamino-4-N-dimethylaminosulfonyl-N-methyl-aminobenzene. | Co-C | Yellow. |
| 72 | 2-amino-1-hydroxy-4-methylsulfonylbenzene. | 1-dimethylaminosulfonylamino-7-hydroxynaphthalene. | Cr-C | Gray. |
| 73 | 2-amino-1-hydroxybenzene-4-sulfonic acid-(2'-hydroxy)-ethylamide. | 1-diethylaminosulfonylamino-7-hydroxynaphthalene. | Cr-C | Do. |
| 74 | 2-amino-1-hydroxy-4-dimethylaminosulfonylaminobenzene. | 2-methylaminonaphthalene. | Cr-C | Gray-green. |
| 75 | ___do___ | 2-(2'-hydroxy)-ethylaminonaphthalene. | Cr-C | Do. |
| 76 | 2-amino-1-hydroxybenzene-4-sulfonic acid-dimethylamide. | 1-dimethylaminosulfonylamino-7-hydroxynaphthalene. | Cr-C | Gray. |
| 77 | 2-amino-1-hydroxybenzene-4-sulfonic acid-cyclohexylamide. | ___do___ | Cr-C | Do. |
| 78 | 2-amino-1-hydroxybenzene-4-sulfonic acid-(4'-methyl)-phenylamide. | ___do___ | Cr-C | Do. |

Formulae of representative dyestuffs of the foregoing examples are as follows:

Example 1

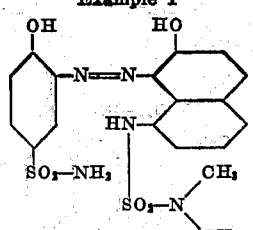

Example 2

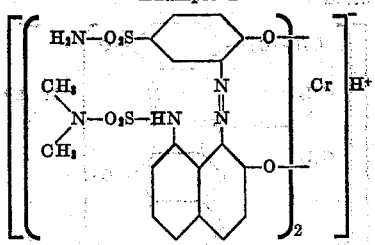

Example 3

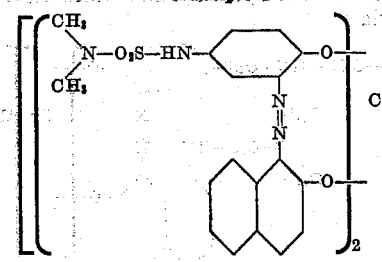

Example 4

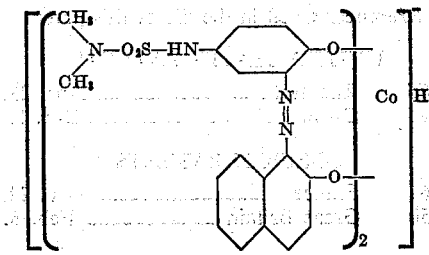

Example 5

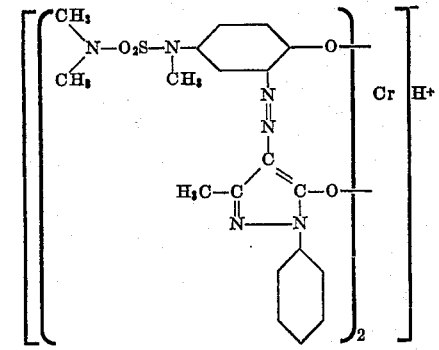

Example 6

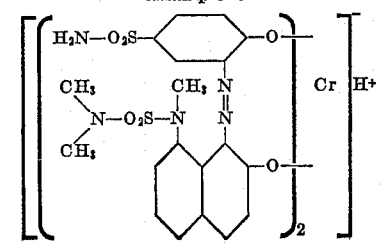

Example 57

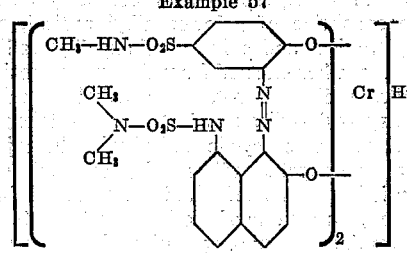

Example 66

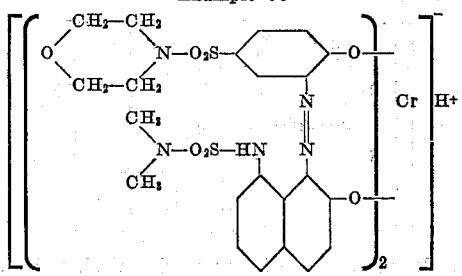

Example 72

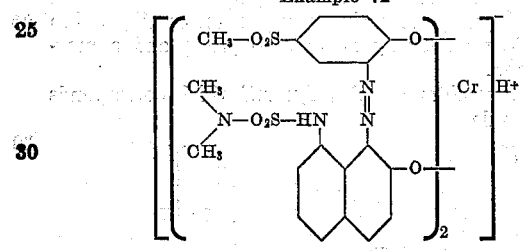

Example 73

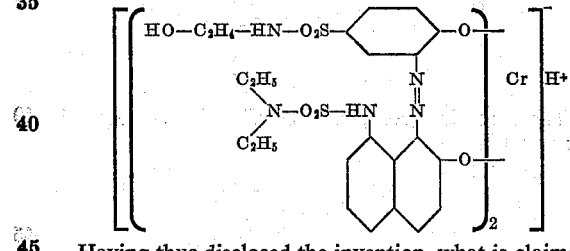

Having thus disclosed the invention, what is claimed is:

1. A member selected from the group consisting of a monoazo dyestuff of the formula

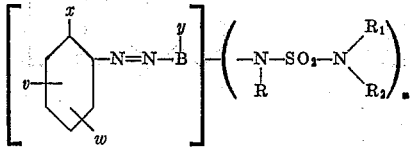

the chromium and the cobalt complex compound thereof, wherein $x$ represents a substituent capable of metal complex formation, $y$ stands in ortho-position to the —N=N— group and represents a member selected from the group consisting of a phenolic hydroxy group, an enolic hydroxy group, and amino, methylamino, hydroxyethylamino and phenylamino, B represents the radical of a coupling component selected from the group consisting of coupling components of the benzene series, coupling components of the naphthalene series, coupling components of the 5-pyrazolone series and coupling components of the acetoacetylamino series, each of $v$ and $w$ represents a member selected from the group consisting of hydrogen, chlorine, nitro, lower alkyl, lower alkanoylamino, lower alkylsulfonyl, sulfonic acid, sulfonic acid-amide, sulfonic acid lower dialkyamide, sulfonic acid lower hydroxyalkylamide, sulfonic acid lower alkoxyalkylamide, sulfonic acid mononuclear arylamide, sulfonic acid cyclohexylamide and sulfonic acid morpholide, R represents a member selected from the group consisting of a hydrogen atom, a lower alkyl radical and a lower hydroxyalkyl radical, $R_1$ represents a member selected from the group consisting of a lower alkyl radical, a lower chloroalkyl radical and a lower alkoxyalkyl radical, $R_2$ represents a member selected from the group consisting of a lower alkyl radical, a lower chloroalkyl radical, and a lower alkoxyalkyl radical; and $R_1$ and $R_2$ taken jointly form a saturated heterocyclic radical with the adjacent N atom, said heterocyclic radical being selected from the group consisting of the morpholino and piperidino radicals, and $n$ represents one of the integers 1 and 2.

2. A chromium complex dyestuff which corresponds to the formula

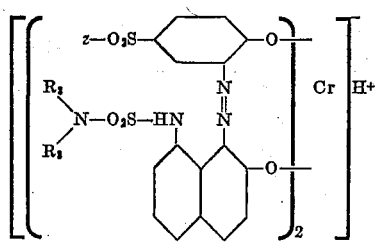

wherein $R_3$ represents a lower alkyl radical, and $z$ represents a member selected from the group consisting of a lower alkyl group, an amino group, a lower alkylamino group, a lower hydroxy alkylamino group and a morpholyl group.

3. The chromium complex dyestuff which corresponds to the formula

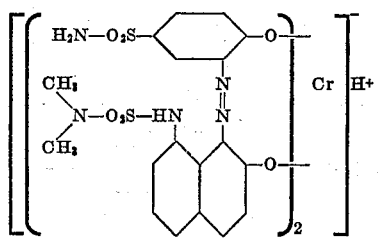

4. The chromium complex dyestuff which corresponds to the formula

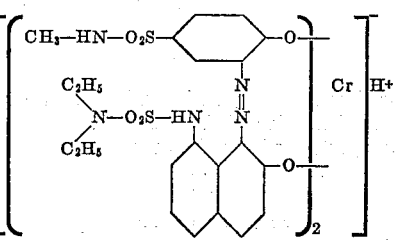

5. The chromium complex dyestuff which corresponds to the formula

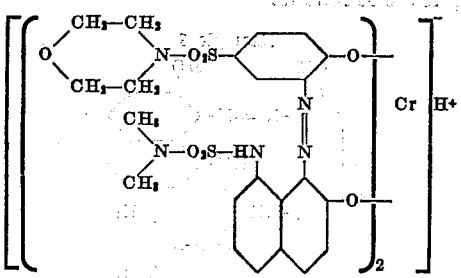

6. The chromium complex dyestuff which corresponds to the formula

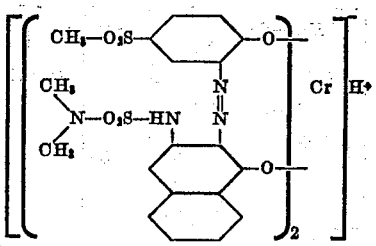

7. The chromium complex dyestuff which corresponds to the formula

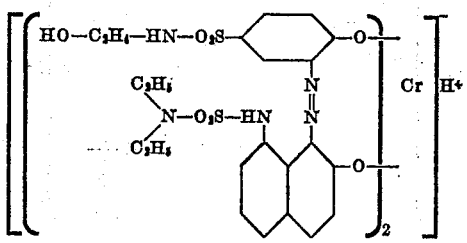

References Cited in the file of this patent

UNITED STATES PATENTS

| | | |
|---|---|---|
| 2,789,975 | Ruckstuhl | Apr. 23, 1957 |
| 2,816,885 | Dittmar et al. | Dec. 17, 1957 |

FOREIGN PATENTS

| | | |
|---|---|---|
| 1,095,561 | France | Dec. 22, 1954 |
| 767,450 | Great Britain | Feb. 6, 1957 |